USOO5631339A

United States Patent [19]
Faler et al.

[11] Patent Number: 5,631,339
[45] Date of Patent: May 20, 1997

[54] ISOCYANATE CURED COATING HAVING REDUCED YELLOWING

[75] Inventors: Dennis L. Faler, Pittsburgh; James R. Franks, Gibsonia; Daniel E. Rardon, Pittsburgh, all of Pa.

[73] Assignee: PPG Industries, Inc., Pittsburgh, Pa.

[21] Appl. No.: 607,841

[22] Filed: Feb. 27, 1996

Related U.S. Application Data

[63] Continuation of Ser. No. 358,219, Dec. 16, 1994, abandoned.

[51] Int. Cl.$^6$ ................................................. C08G 18/80
[52] U.S. Cl. ............................ 528/45; 528/49; 525/124; 524/198
[58] Field of Search ........................ 528/45, 49; 525/124; 524/198

[56] References Cited

U.S. PATENT DOCUMENTS

| 4,369,301 | 1/1983 | König et al. | 528/45 |
| 4,983,738 | 1/1991 | Kazmerczak et al. | 546/208 |
| 5,112,931 | 5/1992 | Potter et al. | 528/45 |
| 5,216,078 | 6/1993 | Cook et al. | 525/124 |

FOREIGN PATENT DOCUMENTS

| 0615992A1 | of 0000 | European Pat. Off. . |
| 94/15984 | of 0000 | WIPO . |

*Primary Examiner*—Rachel Gorr
*Attorney, Agent, or Firm*—Dennis G. Millman

[57] ABSTRACT

Anti-yellowing additives, based on N-amino alkyl carbamates, for use with thermocurable coating compositions containing polyisocyanate crosslinkers capped with ketoxime.

16 Claims, No Drawings

ISOCYANATE CURED COATING HAVING REDUCED YELLOWING

This application is a file wrapper continuation of application Ser. No. 08/358,219 filed Dec. 16, 1994, now abandoned.

BACKGROUND OF THE INVENTION

This invention relates to reducing yellowing caused by thermal curing of polyurethane coatings that utilize a blocked isocyanate crosslinking agent.

Coating compositions can be characterized as being of the one-component type or the two-component type. In the two-component or "two-pack" system, the polymer and the cross-linking agent are combined just prior to coating. The two-component system allows for the use of highly reactive cross-linking agents, which can provide advantageous physical properties to the coating. However, the process usually requires mixing of the components in the right proportion immediately prior to coating, and can be expensive to operate and difficult to control. The one-component or "one-pack" systems offer significant advantages because the cross-linkable clearcoat coating composition can be handled as a single formulation. However, when highly reactive crosslinking agents such as polyisocyanates are used, the cross-linking agent in one-component systems must be blocked in order to prevent premature cross-linking of the clearcoat composition. The blocking group can then be unblocked under specified conditions, such as high heat, to allow the materials to crosslink so the coating can be cured. Isocyanates can be blocked, for example, with ketoximes.

Coatings that have been cross-linked with blocked isocyanate cross-linking agents also exhibit good hardness, and they are resistant to environmental etch. Generally, they suffer from severe yellowing during heat curing. Unlike coatings derived from unblocked isocyanates, where yellowing is primarily limited to aromatic polyisocyanates, coatings derived from blocked isocyanates exhibit yellowing during cure even when an aliphatic polyisocyanate is used. This problem is particularly significant when ketoxime blocking agents are used.

U.S. Pat. No. 4,369,301 discloses incorporating the hydroxy functional reaction product of hydrazine and a cyclic carbonate, which is a hydroxy functional N-amino alkyl carbamate, into a polyisocyanate to reduce yellowing. The result is disclosed as incorporating urethane groups and —NH—NH—CO—O— groups in the polyisocyanate, indicating molecular chain extension by means of the hydroxy functional N-amino alkylcarbamate. The patent is said to be directed to two-component, thermosetting compositions. The use of hydrazide compounds having structural units according to the formula:

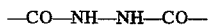

to reduce yellowing in one-component polyurethane coatings utilizing blocked polyisocyanates has been described in U.S. Pat. No. 5,216,078. U.S. Pat. No. 5,112,931 discloses these same structural units incorporated into blocked isocyanates. U.S. Pat. No. 4,983,739 discloses hindered amine stabilizers based on hydrazides that may be separate from the resin systems they are designed to protect.

It is an object of this invention to provide reduced yellowing to coating compositions utilizing one-component polyurethane resin systems employing blocked isocyanate cross-linking agents.

SUMMARY OF THE INVENTION

According to the present invention, there is provided a polyurethane coating composition comprising:
  (a) a polymer comprising at least one functional group that is reactive with isocyanate;
  (b) a polyisocyanate whose isocyanate groups are at least partially blocked with a ketoxime; and
  (c) an N-amino alkyl carbamate compound in which either: (i) the alkyl group contains no groups reactive with isocyanate, or (ii) the N-amino alkyl carbamate is separate from (a) or (b).

The anti-yellowing component (c) need not be reacted with the polyisocyanate in the present invention. Unlike U.S. Pat. No. 4,369,301, the objective here is not to chain extend a polyisocyanate by means of the anti-yellowing group. Therefore, the anti-yellowing compound here need not be utilized as a divalent group, but instead may remain a compound separate from the polyisocyanate, or it may be grafted onto the polyisocyanate. Component (c) may or may not include hydroxyl functionality. In embodiments of component (c) that comprise the reaction products of hydrazine and an alkyl carbonate, hydroxyl functionality is present, and grafting onto the polyisocyanate may occur through either the N-amino or the hydroxyl groups. In the case where both N-amino and hydroxyl functionalities are present, the grafting onto the polyisocyanate can be carried out in such a way as to minimize chain extension. This is achieved by capping the polyisocyanate in stages, first with blocking groups such as ketoximes, followed by grafting with N-amino hydroxyalkyl carbamate. In this way the number of unblocked isocyanate groups available for reaction with either the N-amino or hydroxyl groups of the N-amino hydroxyalkyl carbamate are at a minimum. Other embodiments of N-amino alkyl carbamate have no functionality in the alkyl group reactive with isocyanate, thus precluding any reaction through the alkyl group. An example of the latter embodiment is N-amino tert-butyl carbamate. Compared to prior art approaches that structurally incorporate an anti-yellowing group into the isocyanate molecule, the present invention is advantageous in that the synthesis process is simplified, and molecular weight is not significantly altered. Additionally, more isocyanate functionality remains available for curing.

Coatings utilizing the above composition provided good physical properties such as hardness and low yellowing. Such properties render the coatings ideal for use as the clearcoat of a color-plus-clear composite coating, as is often utilized in the field of automotive coatings. However, the reduced yellowing can be of advantage in colored coatings as well, particularly light colors.

Another aspect of the invention relates to a method of preparing a coating where the above composition is applied to a substrate and cured at an elevated temperature.

DETAILED DESCRIPTION

The composition according to the present invention comprises a polymer having at least one functional group that is reactive with isocyanate. Such polymers include, for example, acrylic polymers, modified acrylic polymers, polyesters, polyepoxides, polycarbonates, polyurethanes, polyamides, polyimides, and polysiloxanes, all of which are well-known in the art. Preferably the polymer is an acrylic, modified acrylic or polyester. More preferably, the polymer is an acrylic polymer. The above polymers may have any of a number of known functional groups that are reactive with isocyanate. Such groups include, for example, hydroxyl groups, amino groups, thiol groups, and hydrazide groups.

In one preferred embodiment of the invention, the polymer is an acrylic. Such polymers are well-known in the art, and can be prepared from monomers such as methyl acrylate, acrylic acid, methacrylic acid, methyl methacrylate, butyl methacrylate, cyclohexyl methacrylate, and the like. The functional groups that are reactive with isocyanate, e.g., hydroxyl groups, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Amino functional acrylic monomers would include t-butylaminoethyl methacrylate and t-butylaminoethyl acrylate. Other acrylic monomers having isocyanate-reactive functional groups in the ester portion of the monomer are also within the skill of the art.

Modified acrylics can also be used as the polymer (a) according to the invention. Such acrylics are typically polyester-modified acrylics or polyurethane-modified acrylics, as is well known in the art. Such a polyester-modified acrylic is described in U.S. Pat. No. 4,546,046. Polyurethane-modified acrylics are also well-known in the art. They are described, for example, in U.S. Pat. No. 4,584,354.

Polyesters having hydroxyl groups, acid groups, or amino groups as isocyanate-reactive groups can also be used as the polymer in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

The composition according to the present invention utilizes a blocked isocyanate as a curing agent for the above-described polymers. Compounds suitable as the isocyanate portion of the blocked isocyanate are well-known in the art, and include toluene diisocyanates, isocyanates of toluene diisocyanate, diphenylmethane-4,4'-diisocyanate, isocyanurates of diphenylmethane-4,4'-diisocyanate, methylene bis-4,4'-isocyanatocyclohexane, isophorone diisocyanate, isocyanurates of isophorone diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4"-triisocyanate, tetramethylxylene diisocyanate, metaxylene diisocyanate, and polyisocyanates.

Groups suitable for use as the blocking agent for the blocked isocyanate are also well-known in the art, and include alcohols, lactams, oximes, malonic esters, alkylacetoacetates, triazoles, phenols and amines. Of these, oximes (e.g., ketoximes) are preferred. Examples include 2-butanone oxime, 2-propanone oxime, cyclohexanone oxime, 2,4-dimethyl-3-pentanone oxime, and 2,6-dimethyl-4-heptanone oxime. In referring to oximes, generic names are commonly used, for example, the generic name for 2-butanone oxime is methyl ethyl ketoxime.

The blocked isocyanate is preferably present in the composition in an amount from about 10 weight percent to about 60 weight percent on a resin solids basis of the three components, and more preferably from about 15 weight percent to about 40 weight percent.

In a preferred embodiment, the blocked isocyanate is a mixture of both an isocyanurate of isophorone diisocyanate and an isocyanurate of 1,6-hexamethylene diisocyanate, wherein the blocker portion is an oxime (e.g., methylethyl ketoxime and wherein the blocked isocyanate is present in an amount of 10–50 weight percent, based on the weight of the one-component formulation.

Anti-yellowing component (c) of the present invention comprises an N-amino alkyl carbamate represented by the structural formula:

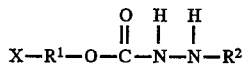

where $R^1$ is chosen from the group consisting of alkyl, cycloalkyl or aryl groups, $R^2$ is chosen from the group consisting of hydrogen, alkyl, cycloalkyl, aryl groups or is a divalent linking group and X is chosen from the group consisting of hydrogen, hydroxyls, amines, halogens or is a divalent linking group. One class of N-amino alkyl carbamates are the reaction products of hydrazine and an alkyl carbonate, e.g., ethylene carbonate or propylene carbonate, in which case X will be a hydroxyl group. In other specific embodiments, X may be hydrogen, such as with N-amino tert-butyl carbamate. Whether used separately or grafted onto the polyisocyanate, the equivalents of N-amino alkyl carbamate present may range from 1% to 10%, preferably 2% to 9%, and most preferably 3% to 8% based on total equivalents of isocyanate groups present.

The compositions of the present invention may include an organometallic crosslinking catalyst. Preferably, the catalyst is an organometallic compound or a tertiary amine compound. More preferably, the catalyst is an organometallic catalyst having tin as the metal. Examples of useful catalysts include metal acetonyl acetates, quaternary ammonium salts, zinc N-ethyl-N-phenyl dithiocarbamate, pentamethyldiethylenetriamine benzoate, cyclohexylamine acetate, N,N-dimethyl cyclohexylamine acetate, ketimines, N-methyl morpholine, tin octoate, stannic chloride, butyl tin trichloride, dibutyl tin diacetate, dibutyl tin dilaurate, bis(2-ethylhexyl) tin oxide, 1,3-diacetoxy tetrabutyl stannoxate, dibutyl dibutoxy tin, lead naphthenate, bismuth trichloride, bismuth octoate, tetrabis(2-ethylhexyl)titanate, tetrabutoxy titanium, stannous octoate, manganese, zirconium, cobalt, lead, bismuth stannate, lead stannate, zirconium octoate, tin dibutyl tin maleate, stannous oxalate, stannous stearate, barium nitrate, zinc nitrate, dibutyltin dilauryl mercaptide, bismuth stearate, lead stearate, dimethyltin dichloride, stannous naphthate, dibutyltin bis-O-phenylphenates, dibutyltin S,S-dibutyldithio-carbonate, and triphenylantimony dichloride. Dibutyltin diacetate is a preferred catalyst.

The catalyst may be present in the composition in an amount of from about 0.01 weight percent to about 10 weight percent, preferably from about 0.1 weight percent to about 2 weight percent, and more preferably about 0.5 weight percent.

A solvent may optionally be utilized in the formulation used in the present invention. In general, the solvent can be any organic solvent. Preferably the solvent is chosen from the group consisting of acetates such as ethyl acetate and butyl acetate, ketones such as methyl isobutyl ketone and methyl ethyl ketone, and blends of aromatic hydrocarbons. The solvent may be present in the composition in an amount of from 10 weight percent to 60 weight percent, preferably from about 30 weight percent to about 50 weight percent.

The above-described coating compositions can be coated on the article by any of a number of techniques well-known in the art. These include, for example, spray coating, dip coating, roll coating, curtain coating, and the like. For automotive body panels, spray coating is preferred.

After the article is coated with the above-described layers according to the invention, the coated article is subjected to conditions so as to cure the coating layers. Although various methods of curing may be used, heat curing is preferred. Generally, heat curing is effected by exposing the coated article to elevated temperatures provided primarily by radiative heat sources. Curing temperatures will vary depending on the particular blocking groups used in the cross-linking agents, however they generally range between 100° C. and 200° C., and are preferably between 130° C. and 160° C. The invention is particularly effective at reducing yellowing that takes place when cure temperatures exceed 140° C., and especially when cure temperatures exceed 160° C. The curing time will vary depending on the blocking agents, and physical parameters such as the thickness of the layers, however, typical curing times range from 15 to 60 minutes.

The examples which follow are submitted for the purpose of further illustrating the nature of the invention in its preferred embodiments.

The following Examples A through E describe the preparation of anti-yellowing additives which are useful in the practice of the invention. As used in the body of the specification, examples, and claims, all percents, ratios and parts are by weight unless otherwise specifically indicated.

EXAMPLE A

An N-amino hydroxyisopropyl carbamate anti-yellowing additive which is particularly useful in the practice of the invention was prepared from the following mixture of ingredients:

| Material | Weight (grams) |
|---|---|
| Charge 1 | |
| Propylene carbonate | 204 |
| Ethanol | 200 |
| Charge 2 | |
| Hydrazine | 60 |

Charge 1 was added, at room temperature, to a suitable reaction vessel fitted with, at the minimum, a stir blade, a heating mantle, reflux column and a nitrogen sparge. Over a period of one hour, with constant stirring, Charge 2 was added to the reaction vessel. The reaction is exothermic, and a peak temperature of 54° C. was observed. After Charge 2 was completely added, the temperature of the reaction vessel was held at 50° C. for an additional three hours. With the completion of the temperature hold, the heat was shut off and the contents of the reaction vessel allowed to cool to room temperature, whereupon they were transferred to a suitable container.

EXAMPLE B

An N-amino hydroxyethyl carbamate anti-yellowing additive which is useful in the practice of the invention was prepared from the following mixture of ingredients:

| Material | Weight (grams) |
|---|---|
| Charge 1 | |
| Ethylene carbonate | 100 |
| Ethanol | 100 |
| Charge 2 | |
| Hydrazine | 36 |

Charge 1 was added, at room temperature, to a suitable reaction vessel fitted with, at the minimum, a stir blade, a heating mantle, reflux column and a nitrogen sparge. Over a period of two hours and twenty minutes, with constant stirring, Charge 2 was added to the reaction vessel. The reaction is exothermic, and a peak temperature of 45° C. was observed. After Charge 2 was completely added, the temperature of the reaction vessel was raised to and held at 50° C. for an additional three hours. With the completion of the temperature hold, the heat was shut off and the contents of the reaction vessel allowed to cool to room temperature, whereupon the product was crystallized and filtered from solution followed by transfer to a suitable container.

EXAMPLE C

A dimer of N-amino hydroxyisopropyl carbamate which is useful as an anti-yellowing additive in the practice of the invention was prepared from the following mixture of ingredients:

| Material | Weight (grams) |
|---|---|
| Charge 1 | |
| Propylene carbonate | 300 |
| Isopropanol | 200 |
| Charge 2 | |
| Hydrazine | 50 |

Charge 1 was added, at room temperature, to a suitable reaction vessel fitted with, at the minimum, a stir blade, a heating mantle, reflux column and a nitrogen sparge. Over a period of two hours, with constant stirring, Charge 2 was added to the reaction vessel. The reaction is exothermic, and a peak temperature of 40° C. was observed. After Charge 2 was completely added, the temperature of the reaction vessel was raised to and held at 80° C. for an additional seven hours. With the completion of the temperature hold, the heat was shut off and the contents of the reaction vessel allowed to cool to room temperature, whereupon they were transferred to a suitable container.

EXAMPLE D

A polyisocyanate crosslinking material, capped with methylethyl ketoxime, trimethylolpropane and N-amino hydroxyisopropylcarbamate, which is useful as an anti-yellowing additive in the practice of the invention was prepared from the following mixture of ingredients:

| Material | Weight (grams) |
|---|---|
| Charge 1 | |
| Isophorone diisocyanate | 663 |
| Butyl acetate | 150 |
| Charge 2 | |
| Dibutyltindilaurate | 0.9 |
| Butyl acetate | 5.0 |

-continued

| Material | Weight (grams) |
| --- | --- |
| Charge 3 | |
| Trimethylolpropane | 45.6 |
| Charge 4 | |
| Trimethylolpropane | 45.6 |
| Charge 5 | |
| Methyl ethyl ketoxime | 261.3 |
| Charge 6 | |
| N-amino hydroxyisopropyl carbamate (solids from Example A) | 58.8 |
| Ethanol (solvent from Example A) | 43.1 |
| Charge 7 | |
| Ethanol | 270 |

Charge 1 was added, at room temperature, to a suitable reaction vessel fitted with, at the minimum, a stir blade, a heating mantle, reflux column and a nitrogen sparge. The temperature was raised to 45° C., after which Charge 2 and Charge 3 were added consecutively. A peak exotherm of 65° C. was observed within ten minutes and then held for 30 minutes after which Charge 4 was added to the reaction vessel. A second exotherm to 97° C. was observed and then held for thirty minutes, after which the contents of the reaction vessel were cooled to a temperature of 75° C. over a period of 40. minutes. Next Charge 5 was added over a period of one hour over which time an exotherm to 98° C. was observed to occur. The contents of the reaction vessel were allowed to cool slowly over a period of 40. minutes to a temperature of 75° C. at which point Charge 6 was added over a period of 4. minutes. With the addition of Charge 6 complete, an exotherm temperature of 93° C. was observed and then held for a period of 2. hours. At the completion of the hold at 93° C., no isocyanate, (NCO), peak was detected by IR spectroscopic methods from extracted samples. The contents of the reaction vessel were then cooled to a temperature of 70° C. and Charge 7 was added slowly. After allowing to stir to homogeneity, the contents of the reaction vessel were cooled to room temperature and transferred to a suitable container. The resulting N-amino alkyl carbamate modified polyisocyanate crosslinking material was determined to have a theory isocyanate, (NCO), equivalent weight on solids of 359.5 grams/equivalent.

EXAMPLE E

An N-beta-hydroxy substituted N-amino hydroxyisopropyl carbamate anti-yellowing additive which is useful in the practice of the invention was prepared from the following mixture of ingredients:

| Material | Weight (grams) |
| --- | --- |
| Charge 1 | |
| N-amino hydroxyisopropylcarbamate (crystallized from Example A) | 40.2 |
| Isopropyl alcohol | 120.2 |
| Charge 2 | |
| Cardura E | 80 |

Charge 1 was added, at room temperature, to a suitable reaction vessel fitted with, at the minimum, a stir blade, a heating mantle, reflux column and a nitrogen sparge. The contents of the reaction vessel were then heated to 60° C. and held at that temperature for 30 minutes. Next, Charge 2 was added to the reaction vessel over a period of 15 minutes. At the completion of the addition of Charge 2, the temperature of the contents of the reaction vessel was observed to rise to 64° C. at which point the heat was shut off. Upon cooling to room temperature, the contents of the reaction vessel were transferred to a suitable container.

EXAMPLE F

A polyisocyanate crosslinking material based on isophorone diisocyanate, capped with methylethyl ketoxime and trimethylolpropane, which is used for comparative purposes in Coating Composition Example VII, was prepared from the following mixture of ingredients:

| Material | Weight (grams) |
| --- | --- |
| Charge 1 | |
| Isophorone diisocyanate | 466.2 |
| Dibutyltindilaurate | 1.86 |
| Triphenylphosphite | 1.86 |
| Butyl acetate | 404.09 |
| Charge 2 | |
| Trimethylolpropane | 31.29 |
| Charge 3 | |
| Trimethylolpropane | 31.29 |
| Charge 4 | |
| Trimethylolpropane | 31.29 |
| Charge 5 | |
| Methyl ethyl ketoxime | 182.95 |
| Dibutyltindilaurate | 1.86 |
| Triphenylphosphite | 1.86 |
| Butyl acetate | 71.21 |
| Charge 6 | |
| Butyl acetate | 25.00 |

Charge 1 was added, at room temperature, to a suitable reaction vessel fitted with, at the minimum, a stir blade, a heating mantle, reflux column and a nitrogen sparge. The temperature was then raised to 45° C. and Charge 2 was added. The heat was turned off and the contents of the reaction vessel were allowed to exotherm. Within five minutes of the completion of the addition of Charge 2, an exotherm peak of 70° C. was observed to occur. The contents of the reaction vessel were held at 70° C. for 30 minutes, after which Charge 3 was added resulting in an exotherm peak of 93° C. The contents of the reaction vessel were allowed to cool to 88° C. followed by a hold at this temperature for 30 minutes. Next, the contents of the reaction vessel were cooled to 65° C. at which point Charge 4 was added resulting in an exotherm peak of 85° C. The contents of the reaction vessel were heated to and held at a temperature of 100° C. for 20 minutes followed by cooling to 65° C. When the contents of the reaction vessel had reached a temperature of 65° C., Charge 5 was added over a period of two hours. With the completion of the addition of Charge 5, Charge 6 was added as a rinse. Over the addition of Charge 5, the temperature was observed to rise to 80° C. The contents of the reaction vessel were held at 80° C. for 1.5 hours after which no isocyanate, (NCO), peak was detected by IR spectroscopic methods from extracted samples. The contents of the reaction vessel were cooled to room temperature and transferred to a suitable container. The resulting polyisocyanate crosslinking material was determined to have a theoretical isocyanate (NCO) equivalent weight on solids of 357.4 grams/equivalent.

The following examples, I through VI, describe the preparation of coatings compositions, making use of the various additives described in Examples A through E, which are useful in the practice of the invention.

The following table lists the ingredients used in the preparation of solvent-borne, one-package, thermosetting, clear coating compositions. Yellowing data obtained from draw-downs of these compositions are useful in demonstrating the effectiveness of the invention. Coating composition Example I is provided here for comparative purposes. The following compositions were mixed together in a suitable container, under low shear conditions, through the use of a standard stir blade.

| | Coating Composition Examples | | | | | |
|---|---|---|---|---|---|---|
| Material | I | II | III | IV | V | VI |
| Acrylic Polyol | 17.9 | 17.9 | 17.9 | 17.9 | 17.9 | 17.9 |
| Desmodur BL-3175A | 7.8 | 7.8 | 7.8 | 4.1 | 7.8 | 7.8 |
| Desmodur BL-4165 | 14.3 | 14.3 | 14.3 | 7.5 | 14.3 | 14.3 |
| Dibutyltindilaurate | 0.14 | 0.14 | 0.14 | 0.14 | 0.14 | 0.14 |
| Additive from Example A | 0.0 | 0.67 | 0.0 | 0.0 | 0.0 | 0.0 |
| Additive from Example C | 0.0 | 0.0 | 1.1 | 0.0 | 0.0 | 0.0 |
| Crosslinker from Example D | 0.0 | 0.0 | 0.0 | 10.2 | 0.0 | 0.0 |
| Additive from Example E | 0.0 | 0.0 | 0.0 | 0.0 | 2.5 | 0.0 |
| N-amino tertiary-butyl carbamate | 0.0 | 0.0 | 0.0 | 0.0 | 0.0 | 0.42 |
| Ethyl acetate | 4.1 | 2.1 | 2.1 | 2.1 | 1.6 | 3.6 |

Acrylic Polyol: hydroxyl equivalent weight=325 grams/equivalent; 70% solids in 2-butanol.

Desmodur BL-3175A is an aliphatic polyisocyanate, available from Miles Inc, based on hexamethylene diisocyanate capped with methyl ethyl ketoxime and 75% solids in aromatic-100.

Desmodur BL-4165 is an aliphatic polyisocyanate, available from Miles Inc, based on isophorone diisocyanate capped with methyl ethyl ketoxime and 65% solids in AROMATIC-100 aromatic solvent blend from Exxon.

The N-amino tertiary-butyl carbamate is available from Aldrich Chemical Company as tertiary-butyl carbazate, catalog number B9,100-5.

The following coating composition Examples VII and VIII further demonstrate the effectiveness of the invention specifically in regard to modification of a polyisocyanate crosslinker, based on isophorone diisocyanate capped with trimethylolpropane and methyl ethyl ketoxime, with an N-amino alkyl carbamate anti-yellowing additive. The following table lists the ingredients used in the preparation of solvent-borne one-pack thermocurable clear coatings formulations.

| | Coating Composition Examples | |
|---|---|---|
| Material | VII | VIII |
| Acrylic Polyol (as described above) | 17.0 | 17.9 |
| Crosslinker of Example F | 23.0 | 0.0 |
| Modified crosslinker of Example D | 0.0 | 21.3 |
| Dibutyltindilaurate | 0.131 | 0.139 |
| Ethyl acetate | 2.6 | 2.1 |

The following table lists the results of a quantitative evaluation of the yellowing associated with cured clear coatings obtained from draw-downs of Coatings Composition Examples I through VI. The coatings were cured at 149° C. for 30 minutes.

| Coating Composition Example | dB Values at 2 mils |
|---|---|
| Example I | 3.5 |
| Example II | 0.8 |
| Example III | 2.0 |
| Example IV | 1.6 |
| Example V | 1.8 |
| Example VI | 1.3 |

The following table lists the results of a quantitative evaluation of the yellowing associated with cured clear coatings obtained from draw-downs of Coatings Composition Examples VII and VIII. The clear coatings were cured at 149° C. for 30 minutes.

| Coatings Composition Example | dB Values at 2 mils |
|---|---|
| Example VII | 5.6 |
| Example VIII | 1.6 |

Quantitative Yellowness Evaluation Method

The clear coatings compositions were drawn-down over an aluminum coil substrate previously coated with a low gloss white coating. The low gloss white coil coating is available from PPG Industries, Inc., as ENVIRON® water based coating. A series of draw-down bars were used such that a film build ladder could be obtained. The clear coatings were cured using an electric oven. Within 24 hours of removing the cured coatings from the oven, colorimeter readings were taken using a Macbeth Color-Eye-3000. The Macbeth Color-Eye-3000 was operated under the following conditions: illuminant C, 10° observer, color equation CIELAB, calibrated using a Macbeth white reference standard. Color readings, in particular Yellowness/Blueness dB values, were obtained relative to a control, the control being a separate piece of low gloss white aluminum coil substrate over which a clear coating had not been applied but which was placed in the oven along with the clear coated samples. Positive dB values indicate that the sample in question is more yellow relative to the control, while negative dB values indicate that the sample in question is more blue relative to the control.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. A coating composition comprising:

(a) a component comprising at least one functional group that is reactive with isocyanate;

(b) a polyisocyanate functional material whose isocyanate groups are at least partially capped with a ketoxime; and (c) an N-amino carbamate separate from (a) or (b) or grafted onto (b), and represented by the structural formula:

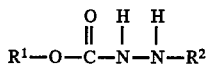

where $R^1$ is chosen from the group consisting of alkyl, cycloalkyl and aryl groups, $R^1$ being substantially free of groups reactive with isocyanate, and $R^2$ is chosen from the group consisting of hydrogen, alkyl, cycloalkyl, and aryl groups.

2. The composition of claim 1 where $R^2$ is chosen from the group consisting of alkyl, cycloalkyl, and aryl groups and is substantially free of groups reactive with isocyanate.

3. A coating composition comprising:
   (a) a component comprising at least one functional group that is reactive with isocyanate;
   (b) a polyisocyanate functional material whose isocyanate groups are partially capped with a ketoxime, and partially capped with an N-amino carbamate moiety represented by the structural formula:

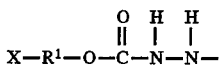

where $R^1$ is chosen from the group consisting of allylene, cycloalloylene, and arylene groups substantially free of groups reactive with isocyanate, and X is hydrogen.

4. The composition according to claim 1 wherein the component comprising at least one functional group that is reactive with isocyanate is a polyol and is chosen, either singly or from mixtures thereof, from the group consisting of polymeric and oligomeric acrylic, polyester and polyurethane polyols.

5. The composition according to claim 4 wherein the polyol is an acrylic polymer having a weight average molecular weight from 1000 to 100,000.

6. The composition according to claim 1 wherein the polyisocyanate is chosen from the group consisting of aliphatic and aromatic isocyanates.

7. The composition according to claim 1 wherein the ketoxime capping agent is methyl ethyl ketoxime.

8. The composition according to claim 1 wherein equivalents of N-amino carbamate present in the formulation is 1 to 10% of equivalents of isocyanate groups present.

9. The composition according to claim 1 wherein the N-amino carbamate is N-amino tert-butyl carbamate.

10. The composition according to claim 1 wherein the polyisocyanate functional material is essentially free of uncapped isocyanate groups.

11. The composition according to claim 3 wherein the component comprising at least one functional group that is reactive with isocyanate is a polyol and is chosen, either singly or from mixtures thereof, from the group consisting of polymeric and oligomeric acrylic, polyester and polyurethane polyols.

12. The composition according to claim 11 wherein the polyol is an acrylic polymer having a weight average molecular weight from 1000 to 100,000.

13. The composition according to claim 3 wherein the polyisocyanate is chosen from the group consisting of aliphatic and aromatic isocyanates.

14. The composition according to claim 3 wherein the ketoxime capping agent is methyl ethyl ketoxime.

15. The composition according to claim 3 wherein equivalents of N-amino carbamate present in the formulation is 1 to 10% of equivalents of isocyanate groups present.

16. The composition according to claim 3 wherein the polyisocyanate functional material is essentially free of uncapped isocyanate groups.

* * * * *